(12) United States Patent
Nozaki et al.

(10) Patent No.: US 11,712,723 B2
(45) Date of Patent: Aug. 1, 2023

(54) CENTRIFUGALLY CAST COMPOSITE ROLL FOR HOT ROLLING

(71) Applicant: PROTERIAL, LTD., Tokyo (JP)

(72) Inventors: Yasunori Nozaki, Kitakyusyu (JP); Nozomu Oda, Kitakyusyu (JP); Toshiyuki Hattori, Kitakyusyu (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/762,548

(22) PCT Filed: Oct. 16, 2020

(86) PCT No.: PCT/JP2020/039148
§ 371 (c)(1),
(2) Date: Mar. 22, 2022

(87) PCT Pub. No.: WO2021/075561
PCT Pub. Date: Apr. 22, 2021

(65) Prior Publication Data
US 2022/0339685 A1  Oct. 27, 2022

(30) Foreign Application Priority Data

Oct. 16, 2019  (JP) .................................. 2019-189441

(51) Int. Cl.
*B21B 27/02* (2006.01)
*C22C 33/08* (2006.01)
(Continued)

(52) U.S. Cl.
CPC ............ *B21B 27/021* (2013.01); *C22C 33/08* (2013.01); *C22C 37/04* (2013.01); *C22C 37/10* (2013.01);
(Continued)

(58) Field of Classification Search
CPC ... B21B 27/00; B21B 27/21; B21B 2001/225; B22D 13/02; B22D 19/16; C22C 33/08; C22C 37/00; C22C 37/04; C22C 37/10
See application file for complete search history.

(56) References Cited

U.S. PATENT DOCUMENTS 9,221,232 B2 * 12/2015 Oda ..................... B22D 13/02
9,724,740 B2 *  8/2017 Oda ..................... B21B 27/032
(Continued)

FOREIGN PATENT DOCUMENTS

JP      09-209073 A      8/1997
JP   2001-279367 A     10/2001
(Continued)

OTHER PUBLICATIONS

International Search Report for PCT/JP2020/039148, dated Dec. 22, 2020.

*Primary Examiner* — Jason L Vaughan
(74) *Attorney, Agent, or Firm* — Sughrue Mion, PLLC

(57) ABSTRACT

A centrifugally cast composite roll for hot rolling comprising an outer layer made of an Fe-based alloy having a chemical composition comprising by mass 2.6-3.6% of C, 0.1-3% of Si, 0.3-2% of Mn, 2.3-5.5% of Ni, 0.5-3.2% of Cr, 0.3-1.6% of Mo, 1.8-3.4% of V, and 0.7-2.4% of Nb, 1.4≤V/Nb≤2.7, a V equivalent (Veq=V+0.55Nb) being 2.60-4% by mass, and the balance being Fe and impurities, and an inner layer made of an iron-based alloy and integrally fused to the outer layer.

5 Claims, 2 Drawing Sheets

(51) Int. Cl.
*C22C 37/04* (2006.01)
*C22C 37/10* (2006.01)
*B21B 1/22* (2006.01)
*B22D 13/02* (2006.01)

(52) U.S. Cl.
CPC ........ *B21B 2001/225* (2013.01); *B22D 13/02* (2013.01)

(56) References Cited

U.S. PATENT DOCUMENTS

| | | | |
|---|---|---|---|
| 9,757,779 B2 * | 9/2017 | Oda | C22C 37/08 |
| 11,192,156 B2 * | 12/2021 | Nozaki | B21B 27/03 |

FOREIGN PATENT DOCUMENTS

| | | | |
|---|---|---|---|
| JP | 2003-073767 A | 3/2003 | |
| JP | 2004-068142 A | 3/2004 | |
| JP | 2008-050681 A | 3/2008 | |
| JP | 2015-080813 A | 4/2015 | |
| JP | 2015-193025 A | 11/2015 | |
| JP | 2016-093839 A | 5/2016 | |
| JP | 2017-185548 A | 10/2017 | |
| JP | 2019-183276 A | 10/2019 | |

* cited by examiner

CENTRIFUGALLY CAST COMPOSITE ROLL FOR HOT ROLLING

CROSS REFERENCE TO RELATED APPLICATIONS

This application is a National Stage of International Application No. PCT/JP2020/039148 filed Oct. 16, 2020, claiming priority based on Japanese Patent Application No. 2019-189441 filed Oct. 16, 2019.

FIELD OF THE INVENTION

The present invention relates to a centrifugally cast composite roll particularly suitable for fifth to seventh stands in a hot strip mill for steel strips, particularly to a centrifugally cast composite roll for hot rolling having good wear resistance in an overall usable range for rolling with suppressed casting defects, and having a good boundary between an outer layer and an inner layer.

BACKGROUND OF THE INVENTION

A heated slab as thick as several tens to 300 millimeters, which is produced by continuous casting, etc., is rolled to thickness of about 1 mm to several tens of millimeters by successively passing between rolls in roughing mills and finishing mills in a hot strip mill. The finishing mill usually comprises 5 to 7 four-roll stands arranged in tandem, and a finishing mill comprising seven stands is particularly widely used. In the seven-stand finishing mill, first to third stands are called "front stands," and fourth to seventh stands are called "rear stands."

Because rolls used in the finishing mill should be able to withstand a thermal and mechanical load by rolling, a centrifugally cast composite roll having a composite structure comprising an outer layer having excellent wear resistance and an inner layer integrally fused to the outer layer and having excellent toughness, which may be called "composite roll" simply, is used therefor. However, because damages such as wearing, surface roughening, heat cracking, etc. occur on the outer surface of the outer layer depending on the thermal and mechanical load by rolling, the composite roll is detached from the mill after use for a predetermined period, to remove damages by grinding (stock removal). By stock removal, the roll body diameter of the composite roll gradually decreases from an initial diameter to a minimum diameter usable for rolling (discard diameter). In this specification, a roll diameter from the initial diameter to the discard diameter is called "usable roll diameter," which may be called "usable diameter" simply, and a usable diameter range from the initial diameter to the discard diameter is called "usable range."

Particularly in the rear stands of the finishing mills, a centrifugally cast composite roll comprising an outer layer of high-alloy indefinite chilled cast iron and an inner layer of cast iron having excellent toughness, which are metallurgically bonded to each other, has conventionally been used. Because the outer layer of high-alloy indefinite chilled cast iron composed of graphite, carbide and a matrix structure has particularly excellent sticking resistance, the generation and propagation of cracks are extremely rare even when it is subjected to cobble, exhibiting excellent incident resistance. Particularly in rear stands, a composite roll comprising an outer layer of high-alloy indefinite chilled cast iron having high incident resistance is widely used, because cobble likely occurs by rolling folded thin steel strips. The high-alloy indefinite chilled cast iron has a type containing only $M_3C$ (cementite), and a type containing a relatively small amount of MC carbides of such an element as vanadium in addition to $M_3C$ (cementite) for improved wear resistance. However, because the high-alloy indefinite chilled cast iron has poorer wear resistance than those of high-chromium cast iron or high-speed steel, various improvements have been made.

JP 2004-68142 A discloses an outer layer of a hot-rolling composite roll having a composition comprising by mass 2.9-3.8% of C, 0.8-2.0% of Si, 0.2-1.5% of Mn, 1.5-3.5% of Cr, 0.8-3.5% of Mo, 3.0-7.0% of Ni, 1.0-3.5% of V, 0.1-0.8% of Nb, 0.020-0.2% of B, and 0.002-0.030% of REM, and meeting the formula (1) of [2.5≤C−(0.236×V+0.129×Nb)≤3.2], and the formula (2) of [0.5<Cr/C<1.0], the balance being Fe and inevitable impurities. JP 2004-68142 A describes that a composite roll having this outer layer has excellent sticking resistance and wear resistance, suitable as a hot-rolling roll for rear stands of steel strips.

Among specific examples described in JP 2004-68142 A, (1) a test piece L comprising 3.76% of C, 1.67% of Cr, 2.38% of V, 0.92% of Nb, 4.62% of Ni, 1.64% of Si, 0.54% of Mn, 1.30% of Mo, 0.054% of B, and 0.011% of REM suffers decrease in strength and toughness by excessive graphite and carbide because the C content is as large as 3.76%, (2) a test piece T comprising 3.46% of C, 2.27% of Cr, 2.46% of V, 0.83% of Nb, 4.55% of Ni, 1.78% of Si, 0.61% of Mn, 0.66% of Mo, 0.042% of B, and 0.019% of REM suffers the problem that MC carbides are segregated in the inner side of the outer layer because the V/Nb ratio is as too high as 2.96, and (3) a test piece W comprising 3.35% of C, 1.97% of Cr, 3.27% of V, 1.57% of Nb, 4.61% of Ni, 1.91% of Si, 0.5% of Mn, 1.32% of Mo, and 0.074% of B likely suffers an uneven or coarse structure due to too much MC carbides because the V equivalent (Veq=V+0.55 Nb) is as much as 4.13% by mass.

JP 2001-279367 A discloses a centrifugally cast roll for hot rolling, which comprises an outer layer made of high-alloy indefinite chilled cast iron comprising by mass 2.7-4.0% of C, 0.5-2% of Si, 0.2-2% of Mn, 0.2-0.8% of Mo, 2.5-6.0% of Ni, 1.0-2.0% of Cr, and 0.01-0.1% of B, and further one or two of 0.2-1.0% of Nb and 0.2-2.0% of V, the balance being Fe and inevitable impurities, and an inner layer made of high-quality cast iron or spheroidal graphite cast iron. In the outer layer of this centrifugally cast roll, proper amounts of Nb and V as well as proper amounts of B, etc. are added to the basic composition of a conventional high-alloy indefinite chilled cast iron. As a result, formed carbides are mostly $M_3C$ (cementite), and the amount of MC carbides is as small as about 3% or less, with fine graphite particles uniformly distributed in the cast structure. JP 2001-279367 A provides an inexpensive hot-rolling roll having excellent wear resistance and cracking resistance without containing large amounts of expensive alloy elements by a centrifugal casting method.

As a specific example of the outer layer, JP 2001-279367 A describes a test piece 11 comprising 3.2% of C, 2.4% of Si, 0.8% of Mn, 0.6% of Mo, 4.2% of Ni, 2.2% of Cr, 1.5% of Nb, 3.5% of V, and 0.04% of B. However, the test piece 11 contains MC carbides tending to be segregated in the inner side of the outer layer because of as too much V as 3.5%, and large amounts of MC carbides because of as much Veq as 4.33% by mass, likely suffering an uneven and coarse structure.

JP 2008-50681 A discloses an outer layer of a centrifugally cast composite roll for rolling, which comprises by mass 2.5-3.4% of C, 0.5-2.0% of Si, 0.5-1.0% of Mn, 3.0-6.0% of Ni, 1.0-2.0% of Cr, 0.2-0.8% of Mo, 1.0-4.0% of V, and 0.2-1.0% of Nb, the percentages by mass of V and Nb meeting the formula (1) of 1≤(V−1)/Nb≤4, and the formula (2) of 0.7≤1.8(V−1)+Nb≤5.0, and the balance being Fe and inevitable impurities. JP 2008-50681 A describes that this outer layer has excellent wear resistance without suffering gravity segregation and surface roughening due to crystallized coarse MC carbides.

JP 2008-50681 A describes as specific examples (1) an outer layer test piece comprising 3.1% of C, 1.8% of Si, 0.8% of Mn, 4.5% of Ni, 1.1% of Cr, 0.3% of Mo, 3.0% of V, 1.0% of Nb, and 0.03% of B, (2) an outer layer test piece comprising 3.2% of C, 1.8% of Si, 0.6% of Mn, 4.1% of Ni, 1.2% of Cr, 0.8% of Mo, 2.0% of V, and 1.0% of Nb, and (3) an outer layer test piece comprising 3.5% of C, 1.1% of Si, 0.4% of Mn, 2.9% of Ni, 1.9% of Cr, 0.2% of Mo, 2.0% of V, and 1.2% of Nb. However, the test piece (1) suffers the problem that MC carbides are unevenly distributed more in the inner side of the outer layer because of as too high a V/Nb ratio as 3. Also, the test pieces (2) and (3) have poor wear resistance because of no B contained, and because of as too low Veq as 2.55% by mass in the test piece (2). Further, the test piece (3) has insufficient hardenability because of as too small the Mo content as 0.2%, exhibiting low matrix hardness and poor wear resistance and incident resistance.

JP 2017-185548 A discloses a centrifugally cast composite roll for hot rolling comprising an outer layer comprising by mass 2.6-3.8% of C, 0.1-3.0% of Si, 0.3-2.0% of Mn, 2.3-5.5% of Ni, 0.5-2.5% of Cr, 0.2-3.0% of Mo, 0.2-3.8% of V, and 0.4-6.8% of Nb, the balance being Fe and inevitable impurities, and having a structure containing 0.3-10% by area of graphite particles, and a shaft portion made of ductile cast iron, the C content at positions longitudinally 100 mm separate from both end surfaces of the outer layer being 0.05-0.3% by mass more than that at the longitudinal center of the outer layer, and the Nb content at positions longitudinally 100 mm separate from both end surfaces of the outer layer being 0.5-3.0% by mass more than that at the longitudinal center of the outer layer. In this roll, the outer layer has excellent wear resistance with less local wearing, such that its center portion in contact with a corresponding center portion of a steel strip being rolled and its end portions in contact with both corresponding end portions of the steel strip are evenly worn. Because of longitudinally even wearing of the outer layer of the roll, the step of grinding locally worn portions can be avoided prior to subsequent rolling, decreasing the loss of the outer layer.

As specific examples in JP 2017-185548 A, the outer layer of Example 1 has a composition comprising 3.34% of C, 1.3% of Si, 0.81% of Mn, 4.12% of Ni, 1.86% of Cr, 0.82% of Mo, 2.33% of V, and 0.78% of Nb, and the outer layer of Example 2 has a composition comprising 3.51% of C, 1.45% of Si, 0.65% of Mn, 4.51% of Ni, 1.58% of Cr, 0.64% of Mo, 2.55% of V, and 0.92% of Nb. In both Examples, however, V/Nb is as too large as 2.99 and 2.77, respectively, MC carbides tend to be distributed more in the inner side of the outer layer, resulting in lower percentages of MC carbides in the usable layer, and thus lower wear resistance.

JP 2003-73767 A discloses an outer layer of a hot-rolling roll having a composition comprising by mass 2.5-4.0% of C, 0.8-2.5% of Si, 0.2-1.5% of Mn, 1.0-3.5% of Cr, 0.5-4.0% of Mo, 3.0-7.0% of Ni, 1.0-3.5% of V, 0.2-1.0% of Nb, 0.02-0.2% of Al, and 0.020-0.10% of B, Cr/C being 1 or less, and the balance being Fe and inevitable impurities, and having a structure containing graphite at an area ratio of 0.6-4%. As a specific example described in JP 2003-73767 A, the ring D has a composition comprising 2.6% of C, 1.7% of Si, 0.5% of Mn, 4.9% of Ni, 3.0% of Cr, 1.2% of Mo, 1.8% of V, 1.3% of Nb, 0.081% of Al, and 0.046% of B. In this ring D, however, V/Nb is as too small as 1.38, and Veq is also as too small as 2.52.

JP 2015-193025 A discloses a composite roll for rolling having an outer layer having a composition comprising by mass 3.0-4.5% of C, more than 0% and 2.0% or less of Si, more than 0% and 1.5% or less of Mn, 3.0-5.0% of Ni, 1.4-4.0% of Cr, 0.1-3.0% of Mo, and more than 0% and 3.0% or less of V, the balance being Fe and inevitable impurities, and meeting the condition of 4.0%≤C+Si/3+Cr/7.5≤5.5%, the area ratio of cementite in a metal structure on a peripheral surface being 40-60%. As a specific example described in JP 2015-193025 A, the outer layer of No. 1 has a composition comprising 3.7% of C, 1.3% of Si, 0.8% of Mn, 4.0% of Ni, 2.1% of Cr, 0.2% of Mo, 2.1% of V, 1.2% of Nb, and 0.05% of B. However, because of as too much C content as 3.7% and as too small Mo content as 0.2%, excessive carbides are formed, resulting in low cracking resistance, insufficient hardenability and matrix hardness, and poor wear resistance and surface roughening resistance.

JP 2015-080813 A discloses a centrifugally cast composite roll for rolling comprising an outer layer and an inner layer, the outer layer having a chemical composition comprising by mass 1.5-4.0% of C, 0.5-3.0% of Si, 0.1-1.5% of Mn, 1.0-6.0% of Ni, 0.1-3.0% of Cr, 0.1-3.0% of Mo, and 1.0-6.0% of V, the balance being Fe and inevitable impurities, and meeting 4.0≤V+C≤8.0 and 0.2≤Si/(Cr+2V)≤0.3. As a specific example described in JP 2015-080813 A, the outer layer of No. 8 has a composition comprising 3.4% of C, 1.6% of Si, 0.8% of Mn, 4.5% of Ni, 1.8% of Cr, 0.5% of Mo, 2.5% of V, 0.9% of Nb, and 0.04% of B. However, because of as too high V/Nb as 2.78, MC carbides are unevenly distributed more in the inner side of the outer layer, failing to obtain good boundary between the outer layer and the inner layer.

OBJECT OF THE INVENTION

Accordingly, an object of the present invention is to provide a centrifugally cast composite roll for hot rolling, which has good wear resistance with suppressed casting defects in an entire range usable for rolling, with good boundary between an outer layer and an inner layer.

SUMMARY OF THE INVENTION

As a result of intensive research in view of the above object, the inventor has found that an outer layer of a hot-rolling composite roll used in hot-strip mills can uniformly have excellent wear resistance with suppressed casting defects in a usable range, and have a good boundary with an inner layer, by optimizing a composition of constituent elements comprising V and Nb, and limiting a V/Nb ratio and a V equivalent (Veq=V+0.55 Nb) in predetermined ranges, such that MC carbides contributing to wear resistance are distributed mainly in a usable range from the initial diameter to the discard diameter. The present invention has been completed based on such finding.

Thus, the centrifugally cast composite roll of the present invention for hot rolling comprises an outer layer made of an Fe-based alloy having a chemical composition comprising by mass 2.6-3.6% of C, 0.1-3% of Si, 0.3-2% of Mn, 2.3-5.5% of Ni, 0.5-3.2% of Cr, 0.3-1.6% of Mo, 1.8-3.4% of V, and 0.7-2.4% of Nb, 1.4≤V/Nb≤2.7, and having a V equivalent (Veq=V+0.55 Nb) of 2.60-4% by mass, the balance being Fe and impurities, and an inner layer made of an iron-based alloy, which is integrally fused to the outer layer.

In the centrifugally cast composite roll of the present invention for hot rolling, the outer layer preferably further contains 0.06% or less by mass of B.

In the centrifugally cast composite roll of the present invention for hot rolling, the outer layer preferably further contains by mass at least one of 0.01-3% of W, 0.01-0.5% of Ti, 0.001-0.5% of Al, 0.01-0.5% of Zr, and 0.1-5% of Co.

In the centrifugally cast composite roll of the present invention for hot rolling, the outer layer preferably has a V equivalent of 3.8% or less by mass.

In the centrifugally cast composite roll of the present invention for hot rolling, the outer layer preferably contains by area 0.3-5% of graphite particles, and 2-20% of MC carbides.

EFFECTS OF THE INVENTION

Because the outer layer of the centrifugally cast composite roll of the present invention for hot rolling comprises 1.8-3.4% by mass of V and 0.7-2.4% by mass of Nb, and meets the conditions of 1.4≤V/Nb≤2.7 and a V equivalent (Veq=V+0.55 Nb) of 2.60-4% by mass, it has excellent wear resistance in both surface layer and deep portion with suppressed casting defects, and has a good boundary with the inner layer (intermediate layer, if any). Therefore, the centrifugally cast composite roll of the present invention for hot rolling is suitable for finishing mills in hot-strip mills.

In addition to the fact that the centrifugally cast composite roll of the present invention for hot rolling is suitable as a work roll for hot-strip mills under severe rolling conditions, it can of course be used as a hot-rolling roll for wires, shaped steel, etc.

BRIEF DESCRIPTION OF THE DRAWINGS

FIG. 3($b$) is a cross-sectional view showing an example of casting molds used for producing the centrifugally cast composite roll of the present invention for hot rolling.

DESCRIPTION OF THE PREFERRED EMBODIMENTS

The embodiments of the present invention will be explained below without intention of restricting the present invention thereto. Various modifications may be added unless they are deviated from the scope of the present invention. The simple description of "%" means "% by mass" unless otherwise mentioned.

[1] Centrifugally Cast Composite Roll for Hot Rolling

Figure 1:
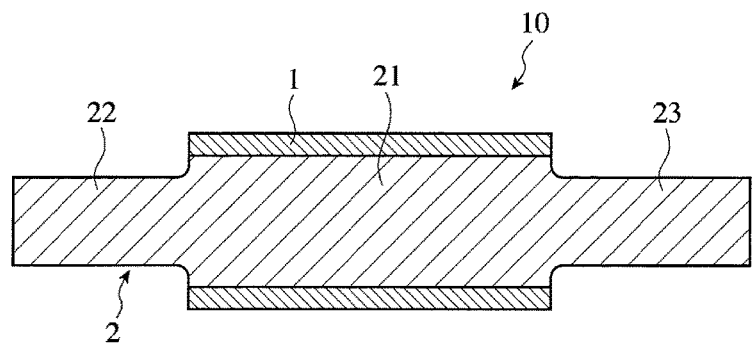
FIG. 1 is a schematic cross-sectional view showing the centrifugally cast composite roll of the present invention for hot rolling.

FIG. 1 shows a composite roll 10 for hot rolling, which comprises a centrifugally cast outer layer 1, and an inner layer 2 integrally fused to the outer layer 1. The inner layer 2 comprises a core portion 21 fused to the outer layer 1, and shaft portions 22, 23 integrally extending from both ends of the core portion 21.

(A) Outer Layer (i) Composition

In the centrifugally cast composite roll of the present invention for hot rolling, the composition of the outer layer is expressed by the composition of an iron-based alloy melt used for forming the outer layer. The composition of the iron-based alloy melt corresponds to an average composition of the entire outer layer. The Fe-based alloy forming the outer layer is basically categorized in "high-alloy indefinite chilled cast irons."

(a) Indispensable Elements (1) C: 2.6-3.6% by Mass

C is combined with V, Nb, Cr and Mo to form hard carbides, contributing to improvement in wear resistance. Also, by the action of graphitization-accelerating elements such as Si, Ni, etc., C is crystallized as graphite in the structure, thereby providing the outer layer with sticking resistance and improving the toughness of the outer layer. When C is less than 2.6% by mass, the crystallization of C to graphite is insufficient, and too small amounts of hard carbides are formed, failing to provide the outer layer with sufficient wear resistance.

On the other hand, when C exceeds 3.6% by mass, flaky graphite is excessively crystallized, decreasing the strength of the outer layer. The excessive crystallization of carbides also provides the outer layer with low toughness and crack resistance, resulting in deep cracks and increased loss by rolling. The lower limit of the C content is preferably 2.7% by mass, and more preferably 2.8% by mass. The upper limit of the C content is preferably 3.5% by mass, and more preferably 3.4% by mass. An example of the C content ranges is preferably 2.7-3.5% by mass, and more preferably 2.8-3.4% by mass.

(2) Si: 0.1-3% by Mass

Si has a function to deoxidize the melt to reduce oxide defects, and accelerate graphitization, contributing to sticking resistance and the suppression of crack propagation. Less than 0.1% by mass of Si has an insufficient function of deoxidizing the melt, as well as a poor function of graphitization. On the other hand, when Si exceeds 3% by mass, the alloy matrix becomes brittle, thereby providing the outer layer with low toughness. The lower limit of the Si content is preferably 0.5% by mass, and more preferably 1% by mass. The upper limit of the Si content is preferably 2.8% by mass, and more preferably 2.5% by mass. An example of the Si content ranges is preferably 0.5-2.8% by mass, and more preferably 1-2.5% by mass.

(3) Mn: 0.3-2% by Mass

Mn has a function to deoxidize the melt, and fix S, an impurity, as MnS. When Mn is less than 0.3% by mass, these effects are insufficient. On the other hand, even though Mn exceeds 2% by mass, further increase in the effects cannot be obtained. The lower limit of the Mn content is preferably 0.4% by mass, and more preferably 0.5% by mass. The upper limit of the Mn content is preferably 1.5% by mass, and more preferably 1% by mass. An example of the Mn content ranges is preferably 0.4-1.5% by mass, and more preferably 0.5-1% by mass.

(4) Ni: 2.3-5.5% by Mass

Ni has a function to crystallize graphite, contributing to sticking resistance. Ni also has a function to improve the hardenability of the matrix structure. When Ni is less than 2.3% by mass, sufficient functions are not obtained. On the other hand, when Ni exceeds 5.5% by mass, austenite is too stabilized, so that it is not easily transformed to bainite or martensite. The lower limit of the Ni content is preferably 2.5% by mass, more preferably 3% by mass, and further preferably 3.5% by mass. The upper limit of the Ni content is preferably 5% by mass, and more preferably 4.8% by mass. An example of the Ni content ranges is preferably 2.5-5% by mass, more preferably 3-4.8% by mass, and further preferably 3.5-4.8% by mass.

(5) Cr: 0.5-3.2% by Mass

Cr is an effective element for improving hardenability and providing a bainite or martensite matrix to have high hardness, thereby keeping wear resistance. When Cr is less than 0.5% by mass, these effects are insufficient. On the other hand, more than 3.2% by mass of Cr hinders the crystallization of graphite, and forms coarse eutectic carbides, lowering the toughness of the matrix structure. The lower limit of the Cr content is preferably 0.7% by mass, and more preferably 1% by mass. The upper limit of the Cr content is preferably 2.8% by mass, more preferably 2.5% by mass, and further preferably 2.3% by mass. An example of the Cr content ranges is preferably 0.7-2.8% by mass, more preferably 1-2.5% by mass, and further preferably 1-2.3% by mass.

(6) Mo: 0.3-1.6% by Mass

Mo is combined with C to form hard Mo carbide, increasing the hardness of the outer layer, and improving the hardenability of the matrix. When Mo is less than 0.3% by mass, these effects are insufficient. On the other hand, when Mo exceeds 1.6% by mass, the outer layer has poor toughness and strong white solidification, hindering the crystallization of graphite. The lower limit of the Mo content is preferably 0.4% by mass. The upper limit of the Mo content is preferably 1.3% by mass, and more preferably 1% by mass. An example of the Mo content ranges is preferably 0.4-1.3% by mass, and more preferably 0.4-1% by mass.

(7) V: 1.8-3.4% by Mass

V is an element combined with C to form hard MC carbide. When V is less than 1.8% by mass, the amount of MC carbides crystallized is insufficient. On the other hand, when V exceeds 3.4% by mass, (a) VC carbide having a low specific gravity is concentrated on the inner side of the outer layer by a centrifugal force during centrifugal casting, so that a range in which the distribution of MC carbides is maximized is deviated from a region between the initial diameter and the discard diameter in the outer layer, and (b) large MC carbides is formed, resulting in a coarse alloy structure, likely causing surface roughening during rolling. The lower limit of the V content is preferably 1.85% by mass, and more preferably 1.9% by mass. The upper limit of the V content is preferably 3% by mass, more preferably 2.7% by mass, and most preferably 2.5% by mass. An example of the V content ranges is preferably 1.85-3% by mass, more preferably 1.9-2.7% by mass, and further preferably 1.9-2.5% by mass.

(8) Nb: 0.7-2.4% by Mass

Nb is combined with C to form MC carbide. Combining Nb with V results in (a) the strengthening of MC carbides by solid solution to improve the wear resistance of the outer layer, and (b) increase in the specific gravity of MC carbides, thereby preventing the segregation of MC carbides in the inner side of the outer layer. When Nb is less than 0.7% by mass, these effects are insufficient. On the other hand, more than 2.4% by mass of Nb excessively increases the specific gravity of MC carbides, so that MC carbides is distributed too much in a region from the outer periphery to the initial diameter, which should be removed. Also, oxides and flux in the melt tend to be attached to NbC, and oxides and flux attached to NbC are likely trapped in the outer layer during solidification. Accordingly, when the Nb content is too high, the attached oxides and flux likely cause casting defects. The lower limit of the Nb content is preferably 0.8% by mass, and more preferably 0.9% by mass. The upper limit of the Nb content is preferably 2.2% by mass, and more preferably 2.0% by mass. An example of the Nb content ranges is preferably 0.8-2.2% by mass, and more preferably 0.9-2.0% by mass.

(9) V/Nb: 1.4-2.7

In the outer layer obtained by centrifugally casting an iron-based alloy containing V and Nb, MC carbides comprising VC and NbC are crystallized. VC having a smaller specific gravity than that of the outer layer melt tends to be segregated in the inner side of the outer layer, while NbC having a larger specific gravity than that of the outer layer melt tends to be segregated in the outer side of the outer layer. Because an outer portion of the centrifugally cast outer layer is removed by machining to the depth of the initial diameter Di (generally 10 mm) as shown in FIG. 2, such that the outer layer is used from the initial diameter Di to the discard diameter Dd of a predetermined depth (for example, to the depth of 50 mm from the initial diameter Di), it is preferable that MC carbides are distributed mainly in a usable range (effective diameter range) from the initial diameter Di to the discard diameter Dd.

Figure 2:
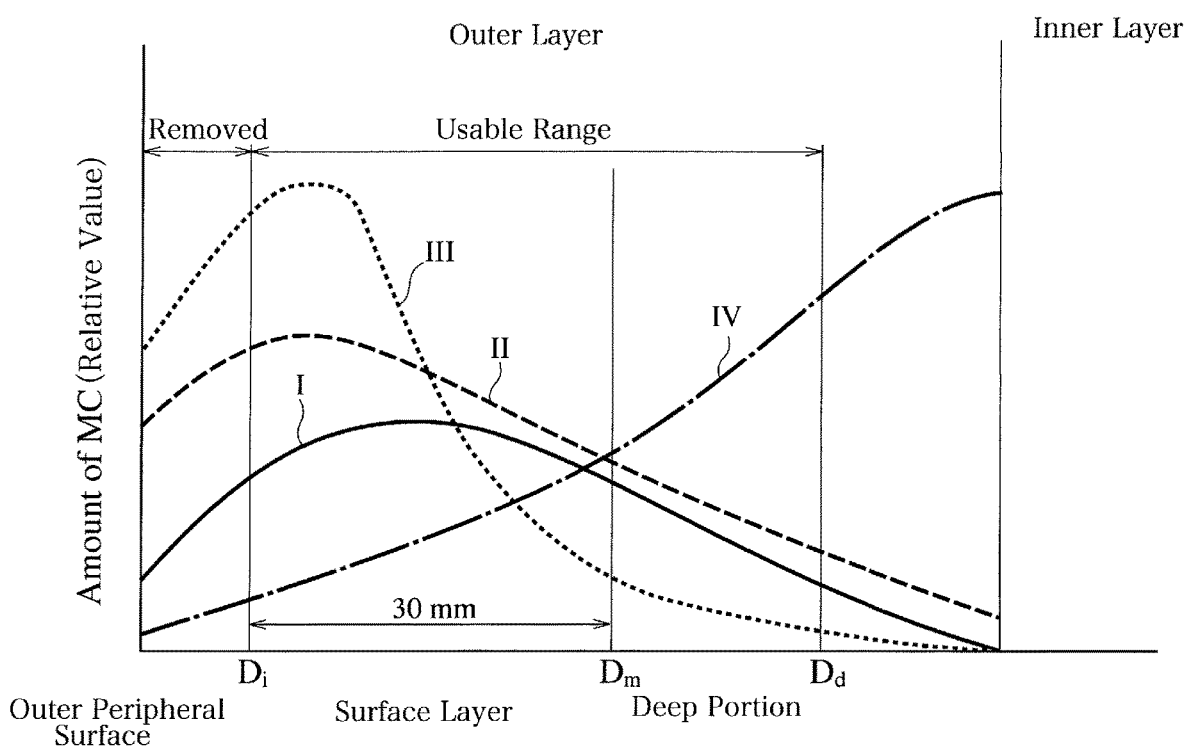
FIG. 2 is a graph schematically showing the distribution of MC carbides in a usable range of an outer layer.

An example of such distributions of MC carbides is shown in FIG. 2. In a distribution I of MC carbides, a peak exists substantially in a center portion of the usable range, and sufficient amount of MC exists in both outer side (surface layer) and inner side (deep portion). In a distribution II of MC carbides, the amount of MC is sufficient in both outer side (surface layer) and inner side (deep portion), though a peak exists near the initial diameter Di. Both distributions I and II of MC carbides are preferable. In a distribution III of MC carbides, however, too high a peak exists near the initial diameter Di, resulting in too small an amount of MC in the deep portion. Accordingly, the deep portion of the outer layer has insufficient wear resistance. Also, in a distribution IV of MC carbides, a peak exists near the inner side, so that sufficient MC carbides do not exist in the usable range. Accordingly, the outer layer having the distribution IV of MC carbides does not exhibit sufficient wear resistance. Thus, both distributions III and IV of MC carbides are not preferable.

NbC is crystallized from the melt at high temperatures, and has high affinity (good wettability) to oxides and oxidation-preventing flux in the melt. As a result, oxides and flux are likely attached to NbC. Because oxides and flux attached to NbC are trapped in the outer layer during solidification, they likely remain as casting defects in the outer layer. Also, because NbC having a higher specific gravity than that of the melt tends to be segregated in the outer side (surface layer) by centrifugal separation, casting defects by oxides and flux attached to NbC tend to appear more in the surface layer of the outer layer.

To suppress such tendency, V and Nb should meet the condition of $1.4 \leq V/Nb \leq 2.7$. When V/Nb is less than 1.4, the amount of crystallized primary NbC increases, making it difficult to suppress casting defects due to oxides and flux attached to NbC. With the condition of $1.4 \leq V/Nb$ met, the amount of crystallized NbC can be properly suppressed even in the melt having a V equivalent (Veq) of 2.60% or more by mass, preventing casting defects in the outer layer. The lower limit of V/Nb is preferably 1.45, and more preferably 1.5.

On the other hand, V/Nb of more than 2.7 leads to a high percentage of VC having a small specific gravity, resulting in more MC carbides segregated in the inner side of the centrifugally cast outer layer. As a result, MC carbides are less distributed in the usable range, and concentrated in the inner side (deep portion) of the outer layer. Because MC carbides having high melting points are not easily remelted when the inner layer (intermediate layer, if any) is cast, the remarkable concentration of MC carbides occurs in the deep portion when Veq is more than 2.6, hindering the fusion of the outer layer to the inner layer (intermediate layer, if any), and thus deteriorating their boundary. The upper limit of V/Nb is preferably 2.65, and more preferably 2.6. An example of the V/Nb ranges is preferably 1.45-2.65, and more preferably 1.5-2.6.

(10) V Equivalent: 2.60-4% by Mass

The amount of MC carbides formed in the outer layer is expressed by a V equivalent (Veq=V+0.55 Nb). Larger Veq provides more MC carbides crystallized. Veq is 2.60-4% by mass. When Veq is less than 2.60% by mass, the amount of MC carbides effective for wear resistance is too small. The lower limit of Veq is preferably 2.65% by mass, more preferably 2.7% by mass, and most preferably 2.8% by mass. On the other hand, too large Veq leads to too small amounts of cementite other than MC carbides and graphite. To have necessary amounts of cementite and graphite, C should be added depending on MC carbides, but too much C and Veq lead to too large amounts of MC carbides solidified faster than the iron matrix. If a liquid phase being solidified contains too much MC carbides, the segregation of MC carbides likely occurs. Accordingly, Veq is 4% or less by mass. Veq is preferably 3.8% or less by mass, more preferably 3.6% or less by mass, and most preferably 3.2% or less by mass. An example of the V equivalent ranges is preferably 2.65-3.8% by mass, more preferably 2.7-3.6% by mass, and most preferably 2.8-3.2% by mass.

(b) Optional Composition

The outer layer of the centrifugally cast composite roll of the present invention for hot rolling may contain the following elements in addition to the above indispensable elements.

(1) B: 0.06% or Less by Mass

B has a function to make carbides finer, and contributes to the crystallization of graphite when added in a small amount. However, more than 0.06% by mass of B provides strong white solidification, making the crystallization of graphite difficult. Accordingly, the B content is preferably 0.06% or less by mass. To obtain sufficient effects of B, the lower limit of the B content is more preferably 0.001% by mass, and most preferably 0.002% by mass. The upper limit of the B content is more preferably 0.04% by mass. An example of the B content ranges is more preferably 0.001-0.04% by mass, and most preferably 0.002-0.04% by mass.

(2) W: 0.01-3% by Mass

W is combined with C to form hard $M_2C$ carbide, contributing to the improvement of the wear resistance of the outer layer. W is also dissolved in MC carbides to increase their specific gravities, resulting in reduced segregation. However, more than 3% by mass of W increases the specific gravity of the melt, resulting in more segregation of carbides. Accordingly, the preferred amount of W, if added, is 3% or less by mass. On the other hand, when W is less than 0.01% by mass, its effects are insufficient. The lower limit of the W content is more preferably 0.02% by mass. The upper limit of the W content is more preferably 2.9% by mass. An example of the more preferred ranges of the W content is 0.02-2.9% by mass.

(3) Zr: 0.01-0.5% by Mass

Zr is combined with C to form MC carbide, thereby improving the wear resistance of the outer layer. Also, Zr oxide formed in the melt functions as crystal nuclei, making the solidified structure finer. Zr also increases the specific gravities of MC carbides, preventing their segregation. However, when Zr exceeds 0.5% by mass, inclusions are unpreferably formed. Accordingly, the amount of Zr, if added, is preferably 0.5% or less by mass. On the other hand, less than 0.01% by mass of Zr does not exhibit sufficient effects. The lower limit of the Zr content is more preferably 0.02% by mass. The upper limit of the Zr content is more preferably 0.4% by mass. An example of the more preferred ranges of the Zr content is 0.02-0.4% by mass.

(4) Co: 0.1-5% by Mass

Co is an element effective for strengthening the matrix structure. Also, Co makes it easy to crystallize graphite. However, more than 5% by mass of Co provides the outer layer with low toughness. Accordingly, the amount of Co, if added, is preferably 5% or less by mass. On the other hand, when Co is less than 0.1% by mass, sufficient effects are not obtained. The lower limit of the Co content is more preferably 0.2% by mass. The upper limit of the Co content is more preferably 4.9% by mass. An example of the more preferred ranges of the Co content is 0.2-4.9% by mass.

(5) Ti: 0.01-0.5% by Mass

Ti is combined with N and O, graphitization-hindering elements, to form oxide or nitride. The oxide or nitride is dispersed as nuclei in the melt, making MC carbides finer and more uniform. However, when Ti exceeds 0.5% by mass, the melt becomes viscous, resulting in more casting defects. Accordingly, the preferable amount of Ti, if added, is 0.5% or less by mass. On the other hand, when Ti is less than 0.01% by mass, sufficient effects are not obtained. The lower limit of the Ti content is more preferably 0.02% by mass. The upper limit of the Ti content is more preferably 0.4% by mass. An example of the more preferred ranges of the Ti content is 0.02-0.4% by mass.

(6) Al: 0.001-0.5% by Mass

Al is combined with N and O, graphitization-hindering elements, to form oxide or nitride, which is dispersed as nuclei in the melt, making MC carbides finer and more uniform. However, when Al exceeds 0.5% by mass, the outer layer becomes brittle, resulting in poor mechanical properties. Accordingly, the preferable amount of Al, if added, is 0.5% or less by mass. On the other hand, when the Al content is less than 0.001% by mass, its effects are insufficient. The lower limit of the Al content is more preferably 0.01% by mass, and further preferably 0.02% by mass. The upper limit of the Al content is more preferably 0.4% by mass. An example of the Al content ranges is more preferably 0.01-0.4% by mass, and further preferably 0.02-0.4% by mass.

(c) Impurities

In the outer layer composition, the balance is substantially composed of Fe and impurities. It is known that P, S, Cu, etc., impurity elements, affect the formation of graphite though they are inevitably contained in trace amounts. It is also known that particularly P and S have influence on graphite even in trace amounts. In order that the centrifugally cast composite roll of the present invention contains graphite particles at a preferable area ratio, it is necessary to control the amounts of impurity elements. Also, because P and S deteriorate the mechanical properties, their amounts should be limited to predetermined levels. Though Cu also has influence on graphite, its influence would be small if it was in a trace amount. Other inevitable impurities include Ca, Ba, Mg, Sb, Te, Ce, etc. Specifically, 0.1% or less by mass of P and S each, 0.5% or less by mass of Cu, 0.05% or less by mass of Ca and Ba each, 0.07% or less by mass of Mg, 0.05% or less by mass of Sb, and 0.03% or less by mass of Te and Ce each are permissible because they do not deteriorate the effects of the present invention.

(ii) Structure

The structure of the outer layer of the centrifugally cast composite roll of the present invention for hot rolling comprises a matrix, graphite, MC carbides and cementite. In the centrifugally cast composite roll of the present invention for hot rolling, the structure of the outer layer preferably contains 0.3-5% by area of graphite particles and 2-20% by area of MC carbides. The matrix structure of the outer layer is preferably composed of substantially martensite, bainite or pearlite. The matrix structure of the outer layer preferably further contains 15-45% by area of a cementite phase.

(a) Area Ratio of Graphite Particles: 0.3-5%

The area ratio of graphite particles crystallized in the outer layer structure is preferably 0.3-5%. When the area ratio of graphite particles is less than 0.3%, the sticking resistance of the outer layer is not sufficiently improved. On the other hand, more than 5% by area of graphite particles provide the outer layer with low mechanical properties. The lower limit of the area ratio of graphite particles is more preferably 0.5%, and most preferably 1%. The upper limit of the area ratio of graphite particles is more preferably 4%, and most preferably 3%. An example of the area ratio ranges of graphite particles is more preferably 0.5-4%, and most preferably 1-3%.

(b) Area Ratio of MC Carbides: 2-20%

When the area ratio of MC carbides crystallized in the outer layer structure is less than 2%, the outer layer may not have sufficient wear resistance. It is difficult to obtain more than 20% by area of MC carbides coexisting with graphite. The area ratio of MC carbides is more preferably 2.2% or more, and further preferably 2.5% or more. To have 0.3-5% by area of graphite particles, the amount of MC carbides is more preferably 17% or less, further preferably 15% or less, and most preferably 10% or less. An example of the area ratio ranges of MC carbides is more preferably 2-17%, further preferably 2-15%, and 0. most preferably 2-10%.

(B) Inner Layer

The iron-based alloy forming the inner layer is preferably a tough ductile cast iron (spheroidal graphite cast iron). The composition of the inner layer is expressed by the composition of an iron-based alloy melt used for forming the inner layer. The composition of the iron-based alloy melt corresponds to the average composition of the entire inner layer. The composition of a ductile cast iron melt comprises by mass 2.3-3.6% of C, 1.5-3.5% of Si, 0.2-2% of Mn, 0.3-2% of Ni, 0.05-1% of Cr, 0.05-1% of Mo, and 0.01-0.08% of Mg, the balance being Fe and impurities preferably. In addition to the above indispensable elements, 0.7% or less of Nb and 0.7% or less of W may be contained. The ductile cast iron mainly comprises ferrite and pearlite as an iron matrix, graphite, and a small amount of cementite. Between the outer layer and the inner layer, an intermediate layer may be formed to suppress or buffer contamination with components, etc.

[2] Production Method of Centrifugally Cast Composite Roll for Hot Rolling

The centrifugally cast composite roll of the present invention for hot rolling can be produced by forming the outer layer by casting an outer layer melt made of an Fe-based alloy having a chemical composition comprising by mass 2.6-3.6% of C, 0.1-3% of Si, 0.3-2% of Mn, 2.3-5.5% of Ni, 0.5-3.2% of Cr, 0.3-1.6% of Mo, 1.8-3.4% of V, and 0.7-2.4% of Nb, 1.4≤V/Nb≤2.7, a V equivalent (Veq=V+0.55 Nb) being 2.60-4% by mass, and the balance being Fe and impurities, at a temperature of an austenite precipitation starting temperature+(30 to 150) ° C., a centrifugal force whose number of times of gravity is in a range of 60-200 G, and an average thickness-increasing speed of 0.5-3 mm/s, into a centrifugal casting die. The average thickness-increasing speed is preferably 0.6 mm/s in lower limit and 2.5 mm/s in upper limit. The "average thickness-increasing speed" of the outer layer is a value obtained by dividing the thickness increase of the cast outer layer by casting time, namely a thickness increase speed of the outer layer per a unit time period.

Figure 3A:
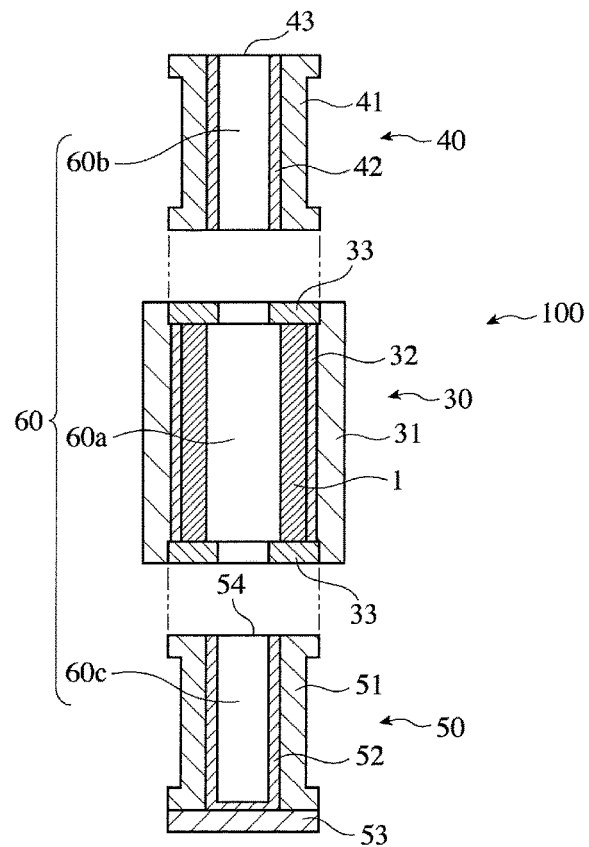
FIG. 3($a$) is an exploded cross-sectional view showing an example of casting molds used for producing the centrifugally cast composite roll of the present invention for hot rolling.
Figure 3B:
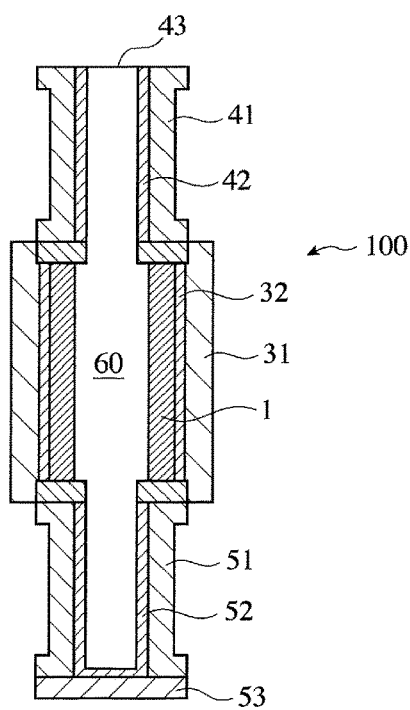

FIGS. 3(a) and 3(b) show an example of static casting molds for casting the inner layer 2 into the outer layer 1 centrifugally cast in a centrifugal casting cylindrical mold 30. The static casting mold 100 comprises a cylindrical casting mold 30 containing the outer layer 1 on the inner surface, and an upper mold 40 and a lower mold 50 mounted to upper and lower ends of the cylindrical mold 30. The cylindrical casting mold 30 comprises a mold body 31, a parting layer 32 formed in the mold body 31, and mold end portions 33 at upper and lower ends of the mold body 31 and the parting layer 32. The upper mold 40 comprises a mold body 41, and a sand mold 42 formed in the mold body 41. The lower mold 50 comprises a mold body 51, and a sand mold 52 formed in the mold body 51. The lower mold 50 is provided with a bottom plate 53 for holding a melt for the inner layer. The inner surface of the outer layer 1 in the cylindrical mold 30 constitutes a cavity 60a for forming a core portion 21 of the inner layer 2, the upper mold 40 has a cavity 60b for forming a shaft portion 23 of the inner layer 2, and the lower mold 50 has a cavity 60c for forming a shaft portion 22 of the inner layer 2. A centrifugal casting method may be conducted by using the cylindrical mold 30, which is horizontal, inclined or vertical.

The cylindrical mold 30 containing the centrifugally cast outer layer 1 is erected on an upper end 54 of the lower mold 50 for forming the shaft portion 22, and the upper mold 40 for forming the shaft portion 23 is mounted onto the cylindrical mold 30 to constitute the static casting mold 100. In the static casting mold 100, the cavity 60a of the outer layer 1 is communicating with the cavity 60b of the upper mold 40 and the cavity 60c of the lower mold 50, constituting a cavity 60 for integrally forming the entire inner layer 1.

As a ductile cast iron melt for the inner layer 2 is poured into the cavity 60 through the upper opening 43 of the upper mold 40, in which the centrifugally cast outer layer 1 is solidified, a surface of the melt gradually elevates in the cavity 60 from the lower mold 50 to the upper mold 40. As a result, the inner layer 2 comprising the shaft portion 22, the core portion 21 and the shaft portion 23 is integrally cast.

The present invention will be explained in further detail by Examples, without intention of restricting the present invention thereto.

Examples 1-4 and Comparative Examples 1-4

With the cylindrical mold 30 (inner diameter: 800 mm, and length: 2500 mm) shown in FIG. 3(a) set in a horizontal centrifugal casting machine, each melt having the composition shown in Table 1 was centrifugally cast to form an outer layer 1 at the temperature, the number of times of gravity and the average thickness-increasing speed shown in Table 2. After the outer layer 1 was solidified, the cylindrical mold 30 having the outer layer 1 (thickness: 90 mm) formed inside was erected, and mounted onto a lower hollow mold 50 (inner diameter: 600 mm, and length: 1500 mm) for forming a shaft portion 22. An upper hollow mold 40 (inner diameter: 600 mm, and length: 2000 mm) for forming a shaft portion 23 was mounted onto the cylindrical mold 30, to constitute a static casting mold 100 shown in FIG. 3(b).

A ductile cast iron melt having a chemical composition comprising by mass 3.0% of C, 2.6% of Si, 0.3% of Mn, 1.4% of Ni, 0.1% of Cr, 0.2% of Mo, 0.05% of Mg, 0.03% of P, and 0.03% of S, the balance being Fe and impurities, was poured into the cavity 60 of the static casting mold 100 through the upper opening 43, during which a graphitization inoculant containing Si was added, to produce a composite roll having an inner layer 2 integrally fused to an inner surface of the outer layer 1.

TABLE 1

| No. | Composition of Melt (% by mass)[1] | | | | | | | |
|---|---|---|---|---|---|---|---|---|
| | C | Si | Mn | Ni | Cr | Mo | V | Nb |
| Example 1 | 3.20 | 1.29 | 0.65 | 4.04 | 1.33 | 0.54 | 2.11 | 1.40 |
| Example 2 | 3.36 | 1.63 | 0.57 | 4.46 | 1.69 | 0.83 | 2.33 | 0.92 |
| Example 3 | 3.35 | 1.45 | 0.75 | 4.22 | 1.80 | 0.80 | 2.06 | 1.27 |
| Example 4 | 3.32 | 1.69 | 0.65 | 4.12 | 1.43 | 0.88 | 2.37 | 1.18 |
| Com. Ex. 1 | 3.34 | 1.76 | 0.93 | 4.18 | 1.86 | 0.66 | 1.66 | 0.80 |
| Com. Ex. 2 | 3.33 | 1.73 | 0.75 | 4.22 | 1.80 | 1.31 | 2.15 | 0.55 |
| Com. Ex. 3 | 3.50 | 1.70 | 0.51 | 4.48 | 1.83 | 0.78 | 2.62 | 0.60 |
| Com. Ex. 4 | 3.29 | 1.71 | 0.70 | 4.28 | 1.75 | 0.58 | 1.85 | 1.50 |

Note:
[1]Corresponding to the average composition of the outer later.

| | Outer Layer | |
|---|---|---|
| No. | V/Nb | Veq[1] |
| Example 1 | 1.51 | 2.88 |
| Example 2 | 2.53 | 2.84 |
| Example 3 | 1.62 | 2.76 |
| Example 4 | 2.01 | 3.02 |
| Com. Ex. 1 | 2.08 | 2.10 |
| Com. Ex. 2 | 3.91 | 2.45 |
| Com. Ex. 3 | 4.37 | 2.95 |
| Com. Ex. 4 | 1.23 | 2.68 |

Note:
[1]Veq = V + 0.55 Nb (unit: % by mass).

TABLE 2

| | Production Conditions | | |
|---|---|---|---|
| No. | Casting Temperature (° C.)[1] | Number of Times of Gravity (G) | Average Thickness-Increasing Speed (mm/s) |
| Example 1 | γ + 75 | 140 | 1.5 |
| Example 2 | γ + 61 | 100 | 1.2 |
| Example 3 | γ + 62 | 110 | 1.1 |
| Example 4 | γ + 70 | 140 | 1.2 |
| Com. Ex. 1 | γ + 65 | 110 | 2.0 |
| Com. Ex. 2 | γ + 58 | 120 | 1.6 |
| Com. Ex. 3 | γ + 80 | 100 | 0.8 |
| Com. Ex. 4 | γ + 65 | 120 | 1.2 |

Note:
[1] γ represents the austenite precipitation-starting temperature.

In each composite roll of Examples 1-4 and Comparative Examples 1-4, the integrity of a boundary between the outer layer and the inner layer, the distribution of MC carbides in the outer layer, the wear resistance of surface and deep portions of the outer layer, and casting defects in the outer layer were measured by the following methods.

(1) Soundness of Boundary Between Outer Layer and Inner Layer

By an ultrasonic testing method using an ultrasonic probe scanning an entire surface of the outer layer, defects in the outer layer were inspected and evaluated by the following standards.

Good: There were no defects having diameters of 10 mm or more in a boundary between the outer layer and the inner layer.

Poor: There were defects having diameters of 10 mm or more in a boundary between the outer layer and the inner layer.

(2) Distribution of MC Carbides in Outer Layer

In a longitudinal end portion of each outer layer, the structure of the outer layer was microscopically observed at positions corresponding to the depths of 10 mm, 20 mm, 30 mm, 40 mm and 50 mm, respectively, from the initial diameter Di (as deep as about 10 mm from the as-cast surface), and the distribution of MC carbides was categorized into patterns I to IV shown in FIG. 2.

(3) Average Wear Resistance of Usable Layer of Outer Layer

The average wear resistance of the usable layer of the outer layer was evaluated according to the distribution of a V equivalent (Veq=V+0.55 Nb) by the following standards.

Good: The V equivalent in the melt composition used for the outer layer was 2.6 or more.

Poor: The V equivalent in the melt composition used for the outer layer was less than 2.6.

(3) Wear Resistance of Surface and Deep Portions of Usable Layer of Outer Layer

The wear resistance of surface and deep portions of the usable layer of the outer layer was judged according to the distribution of a V equivalent (Veq=V+0.55 Nb) by the following standards.

Poor: The smallest V equivalents in both surface and deep portions of the usable layer were less than 60% of the average V equivalent of the outer layer melt.

Fair: The smallest V equivalents in both surface and deep portions of the usable layer were 60% or more and less than 70% of the average V equivalent of the outer layer melt.

Good: The smallest V equivalents in both surface and deep portions of the usable layer were 70% or more of the average V equivalent of the outer layer melt.

(4) Casting Defects in Outer Layer

By an ultrasonic testing method using an ultrasonic probe scanning an entire surface of the outer layer, defects in the outer layer were inspected and evaluated by the following standards.

Good: There were no casting defects having diameters of 1 mm or more in the outer layer.

Poor: There were casting defects having diameters of 1 mm or more in the outer layer.

Using the evaluation results of the soundness of a boundary between the outer layer and the inner layer, the average wear resistance of the usable layer of the outer layer, and the wear resistance of surface and deep portions of the outer layer, and casting defects in the outer layer, total evaluation was conducted by the following standards.

Good: All items were evaluated as Good.

Fair: The total number of items evaluated as Poor or Fair was 1 or 2.

Poor: The total number of items evaluated as Poor or Fair was 3 or more.

TABLE 3

| No. | Soundness of Boundary | Distribution of MC Carbides | Wear Resistance | | | Casting Defects in Outer Layer | Total Evaluation |
|---|---|---|---|---|---|---|---|
| | | | Usable Layer[1] | Surface Layer[2] | Deep Portion[3] | | |
| Example 1 | Good | II | Good | Good | Good | Good | Good |
| Example 2 | Good | I | Good | Good | Good | Good | Good |
| Example 3 | Good | II | Good | Good | Good | Good | Good |
| Example 4 | Good | I | Good | Good | Good | Good | Good |
| Com. Ex. 1 | Good | I | Poor | Good | Good | Good | Fair |
| Com. Ex. 2 | Good | IV | Poor | Poor | Fair | Good | Poor |
| Com. Ex. 3 | Poor | IV | Good | Poor | Good | Good | Fair |
| Com. Ex. 4 | Good | III | Good | Good | Poor | Poor | Fair |

Note:
[1] The average wear resistance of the entire usable layer of the outer layer.
[2] The wear resistance of the usable layer surface of the outer layer.
[3] The wear resistance of the deep portion of the usable layer of the outer layer.

As is clear from Table 3, the centrifugally cast composite rolls of Examples 1-4 were excellent in all of the integrity of a boundary between the inner layer and the outer layer, the wear resistance of surface and deep portions of the outer layer, and casting defects in the outer layer. In the centrifugally cast composite rolls of Comparative Examples 1-4, on the other hand, one or more of the above items were evaluated as Poor. Specifically, in Comparative Examples 1 and 2, both surface and deep portions of the outer layer did not have sufficient wear resistance because of Veq of less than 2.60. In Comparative Example 3, the boundary had poor integrity because of as too high V/Nb as 4.37. Further, in Comparative Example 4, the distribution of MC carbides was categorized into the pattern III because of as low V/Nb as 1.23, with insufficient wear resistance in the deep portion of the outer layer, and casting defects sin the outer layer.

DESCRIPTION OF REFERENCE NUMERALS

1: Outer layer
2: Inner layer
10: Centrifugally cast composite roll for hot rolling
21: Core portion
22, 23: Shaft portion
30: Cylindrical mold for centrifugal casting
31, 41, 51: Casting mold body
32: Parting layer
33: End portion of casting mold
42, 52: Sand mold
40: Upper mold for static casting
50: Lower mold for static casting
60, 60a, 60b, 60c: Cavity
100: Static casting mold

What is claimed is:

1. A centrifugally cast composite roll for hot rolling comprising an outer layer made of an Fe-based alloy having a chemical composition comprising by mass 2.6-3.6% of C, 0.1-3% of Si, 0.3-2% of Mn, 2.3-5.5% of Ni, 0.5-3.2% of Cr, 0.3-1.6% of Mo, 1.8-3.4% of V, and 0.7-2.4% of Nb, $1.4 \leq V/Nb \leq 2.7$, a V equivalent (Veq=V+0.55Nb) being 2.60-4% by mass, and the balance being Fe and impurities, and an inner layer made of an iron-based alloy, which is integrally fused to said outer layer.

2. The centrifugally cast composite roll for hot rolling according to claim 1, wherein said outer layer further contains 0.06% or less by mass of B.

3. The centrifugally cast composite roll for hot rolling according to claim 1, wherein said outer layer further contains one or more of 0.01-3% of W, 0.01-0.5% of Ti, 0.001-0.5% of Al, 0.01-0.5% of Zr, and 0.1-5% of Co by mass.

4. The centrifugally cast composite roll for hot rolling according to claim 1, wherein said outer layer has a V equivalent of 3.8% or less by mass.

5. The centrifugally cast composite roll for hot rolling according to claim 1, wherein said outer layer contains by area 0.3-5% of graphite particles and 2-20% of MC carbides.

* * * * *